United States Patent
Fukushima

(10) Patent No.: US 9,979,842 B2
(45) Date of Patent: May 22, 2018

(54) IMAGE FORMING APPARATUS THAT TRANSMITS AND RECEIVES MAINTENANCE WORK DATA TO AND FROM INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Kenta Fukushima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 371 days.

(21) Appl. No.: 14/457,305

(22) Filed: Aug. 12, 2014

(65) Prior Publication Data
US 2015/0049161 A1    Feb. 19, 2015

(30) Foreign Application Priority Data

Aug. 14, 2013    (JP) ................................ 2013-168570

(51) Int. Cl.
*H04N 1/00*    (2006.01)
*H04N 1/42*    (2006.01)
(Continued)

(52) U.S. Cl.
CPC ......... *H04N 1/00344* (2013.01); *G06F 3/048* (2013.01); *G06Q 10/20* (2013.01);
(Continued)

(58) Field of Classification Search
USPC ...... 340/10.51, 425.5, 636.1; 348/14, 14.04; 358/1.13, 1.14; 379/9, 265.11, 266.01,
(Continued)

(56) References Cited

U.S. PATENT DOCUMENTS 5,303,005 A    4/1994    Takano et al.
6,330,499 B1 *  12/2001    Chou ..................... G07C 5/008
                                                    701/31.4
(Continued)

FOREIGN PATENT DOCUMENTS

CN    102404384 A    4/2012
JP    H10207658 A    8/1998
(Continued)

OTHER PUBLICATIONS

Office Action issued in U.S. Appl. No. 14/459,592, dated Nov. 12, 2015.
(Continued)

*Primary Examiner* — Gerald Gauthier
(74) *Attorney, Agent, or Firm* — Rossi, Kimms & McDowell LLP

(57) ABSTRACT

An image forming apparatus capable of reducing the trouble of operation of the user, when being disconnected from and reconnected to an information processing apparatus for transmission and reception of maintenance work data for maintenance work. When the image forming apparatus is disconnected from and reconnected to the information processing apparatus for the above-mentioned purpose, identification information for identifying the information processing apparatus to be reconnected is stored in a storage section. An icon for enabling user to reconnect to the information processing apparatus identified by the identification information is displayed on a display section when the identification information is stored. The image forming apparatus reconnects to the information processing apparatus when the reconnection is instructed by the user using the icon.

13 Claims, 6 Drawing Sheets

(51) Int. Cl.
| | |
|---|---|
| *H04N 7/14* | (2006.01) |
| *G06Q 10/00* | (2012.01) |
| *G06F 3/048* | (2013.01) |
| *H04L 12/00* | (2006.01) |
| *H04L 29/14* | (2006.01) |
| *H04L 12/64* | (2006.01) |
| *H04L 29/08* | (2006.01) |

(52) U.S. Cl.
CPC .......... *H04L 12/00* (2013.01); *H04L 12/6418* (2013.01); *H04L 69/40* (2013.01); *H04N 1/00917* (2013.01); *H04N 1/00928* (2013.01); *H04N 1/42* (2013.01); *H04N 7/147* (2013.01); *H04N 7/148* (2013.01); *H04L 67/12* (2013.01)

(58) Field of Classification Search
USPC ........ 379/266.08; 455/414.2; 705/2, 3, 7.11, 705/7.13, 14.53, 14.55, 304, 305; 707/748, 769, 949; 701/31.4; 709/223; 715/765
See application file for complete search history.

(56) References Cited

U.S. PATENT DOCUMENTS

| | | | | |
|---|---|---|---|---|
| 6,832,199 | B1* | 12/2004 | Kucek | A61B 5/0002 600/300 |
| 7,023,979 | B1* | 4/2006 | Wu | H04M 3/5233 379/265.11 |
| 7,792,889 | B1* | 9/2010 | Lee | G06Q 30/02 707/948 |
| 8,813,059 | B2* | 8/2014 | Sasaki | G06F 8/65 717/168 |
| 9,805,526 | B2* | 10/2017 | Leung | G07C 5/0825 |
| 2002/0147732 | A1* | 10/2002 | Lee | G06F 17/30286 |
| 2002/0194214 | A1 | 12/2002 | Fukazawa | |
| 2003/0025732 | A1* | 2/2003 | Prichard | G06F 8/38 715/765 |
| 2004/0181443 | A1* | 9/2004 | Horton | G06Q 10/06 705/7.13 |
| 2004/0260704 | A1 | 12/2004 | Moore | |
| 2005/0044248 | A1 | 2/2005 | Mihira et al. | |
| 2007/0005157 | A1 | 2/2007 | Tanimoto | |
| 2007/0058196 | A1 | 3/2007 | Nagahara et al. | |
| 2007/0109105 | A1* | 5/2007 | Ohno | G07C 5/008 340/425.5 |
| 2007/0116185 | A1* | 5/2007 | Savoor | H04M 3/5191 379/9 |
| 2007/0300291 | A1 | 12/2007 | Bomgaars et al. | |
| 2008/0037764 | A1* | 2/2008 | Lee | H04M 3/12 379/266.01 |
| 2008/0104252 | A1 | 5/2008 | Henniger | |
| 2009/0063275 | A1* | 3/2009 | Barak | G06Q 30/0255 705/14.53 |
| 2009/0089457 | A1 | 4/2009 | Zhan | |
| 2009/0247136 | A1* | 10/2009 | Srinivasan | H04M 3/51 455/414.2 |
| 2009/0307027 | A1* | 12/2009 | Charbeneau | G06Q 10/087 705/305 |
| 2010/0055656 | A1* | 3/2010 | Lemmers | G06F 19/3418 434/262 |
| 2010/0088416 | A1 | 4/2010 | Kurita | |
| 2010/0198863 | A1* | 8/2010 | Lee | G06Q 10/10 707/769 |
| 2010/0228588 | A1* | 9/2010 | Nielsen | G06Q 10/06 705/7.11 |
| 2011/0099272 | A1 | 5/2011 | Takahashi | |
| 2011/0196667 | A1 | 8/2011 | Sasaki | |
| 2011/0239208 | A1* | 9/2011 | Jung | G06F 8/65 717/170 |
| 2011/0265188 | A1* | 10/2011 | Ramaswamy | G06F 9/4443 726/28 |
| 2011/0320277 | A1* | 12/2011 | Isaacs | G06Q 30/02 705/14.55 |
| 2012/0013936 | A1* | 1/2012 | Sawada | G06K 15/402 358/1.14 |
| 2012/0084369 | A1 | 4/2012 | Henriquez et al. | |
| 2013/0042232 | A1 | 2/2013 | Hirokawa | |
| 2013/0054770 | A1* | 2/2013 | Lawson | H04L 63/20 709/223 |
| 2013/0097179 | A1* | 4/2013 | Moshrefi | G06F 17/30867 707/748 |
| 2013/0201506 | A1* | 8/2013 | Oka | H04N 1/001 358/1.13 |
| 2013/0321849 | A1 | 12/2013 | Masui et al. | |
| 2014/0222462 | A1* | 8/2014 | Shakil | G06Q 50/22 705/3 |
| 2014/0292498 | A1* | 10/2014 | Hosoya | G06Q 10/00 340/10.51 |
| 2014/0292524 | A1* | 10/2014 | Nallabelli | H02J 7/0047 340/636.1 |
| 2014/0348321 | A1* | 11/2014 | Javaregowda | H04M 3/5238 379/266.08 |
| 2015/0049161 | A1* | 2/2015 | Fukushima | H04N 1/00344 348/14.04 |
| 2016/0063508 | A1* | 3/2016 | Fukushima | G06Q 30/016 705/304 |

FOREIGN PATENT DOCUMENTS

| | | |
|---|---|---|
| JP | 2003076533 A | 3/2003 |
| JP | 2005208974 A | 8/2005 |
| JP | 2007221709 A | 8/2007 |
| JP | 2009104586 A | 5/2009 |
| JP | 2010093585 A | 4/2010 |
| JP | 2011091773 A | 5/2011 |
| JP | 2013093651 A | 5/2013 |

OTHER PUBLICATIONS

European Office Action issued in counterpart application No. EP14180773.5, dated Jan. 8, 2016.
Office Action issued in Korean Application No. 10-2014-0101607 dated May 17, 2016.
Office Action issued in Korean Application No. 10-2014-0101609 dated May 17, 2016.
Office Action issued in U.S. Appl. No. 14/459,592, dated May 8, 2015.
Extended European Search Report issued in application No. EP14180774.3, dated Feb. 26, 2015.
Extended European Search Report issued in counterpart application No. EP14180773.5, dated Feb. 26, 2015.
Nobuhito Miyauchi, Allround Internet Telephony Protocol: HTTP-based Conference Application Protocol (Special Issue on High Speed Networks and Multimedia Applications) Information Processing Society of Japan Journal vol. 44 No. 3, 553-560, Mar. 2003.
Office Action issued in Chinese patent application No. 201410392486.8 dated Dec. 30, 2016. English translation provided.
Notice of Allowance issued in Korean Application No. 10-2017-0052154 dated Feb. 23, 2018. English translation provided.

* cited by examiner

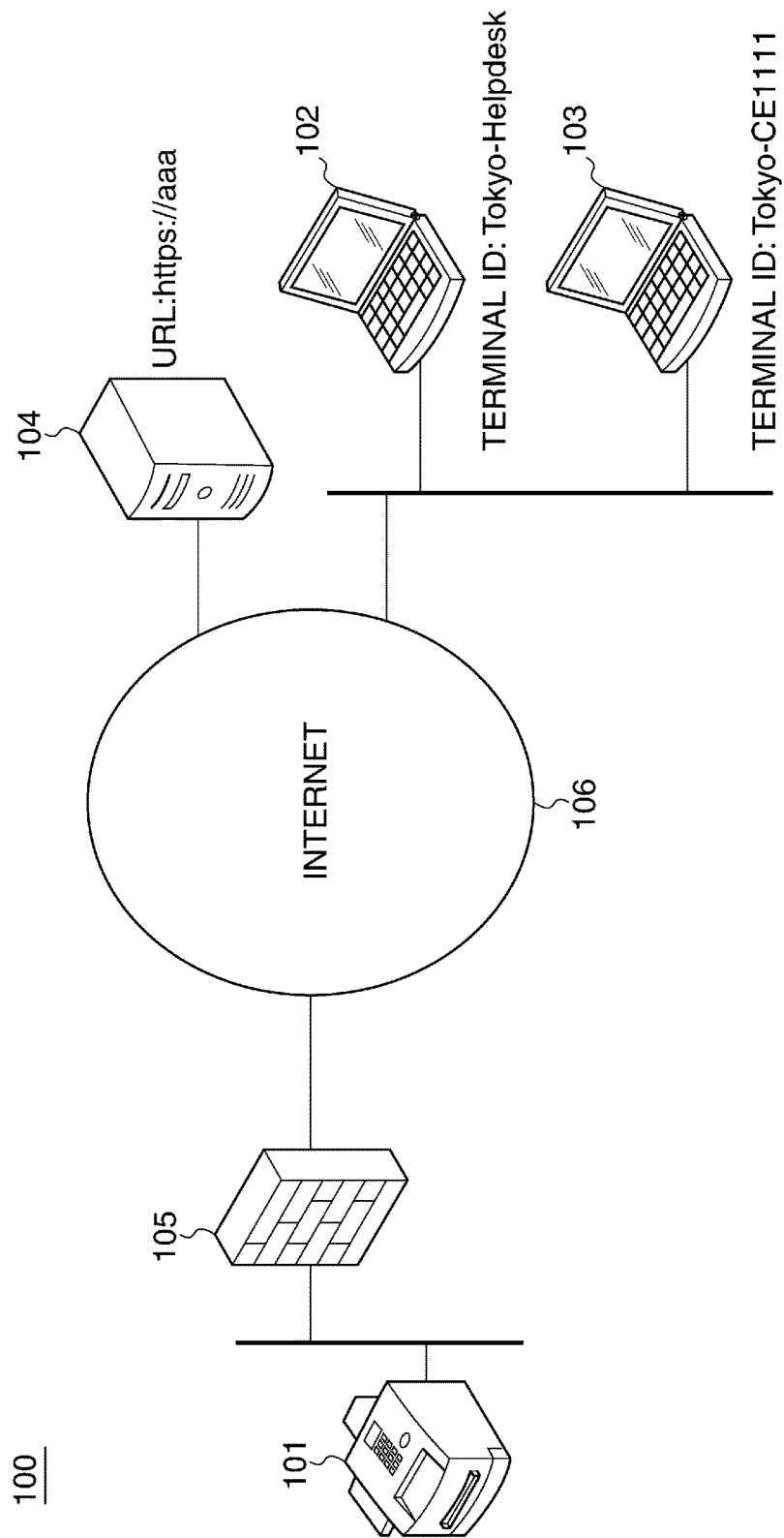

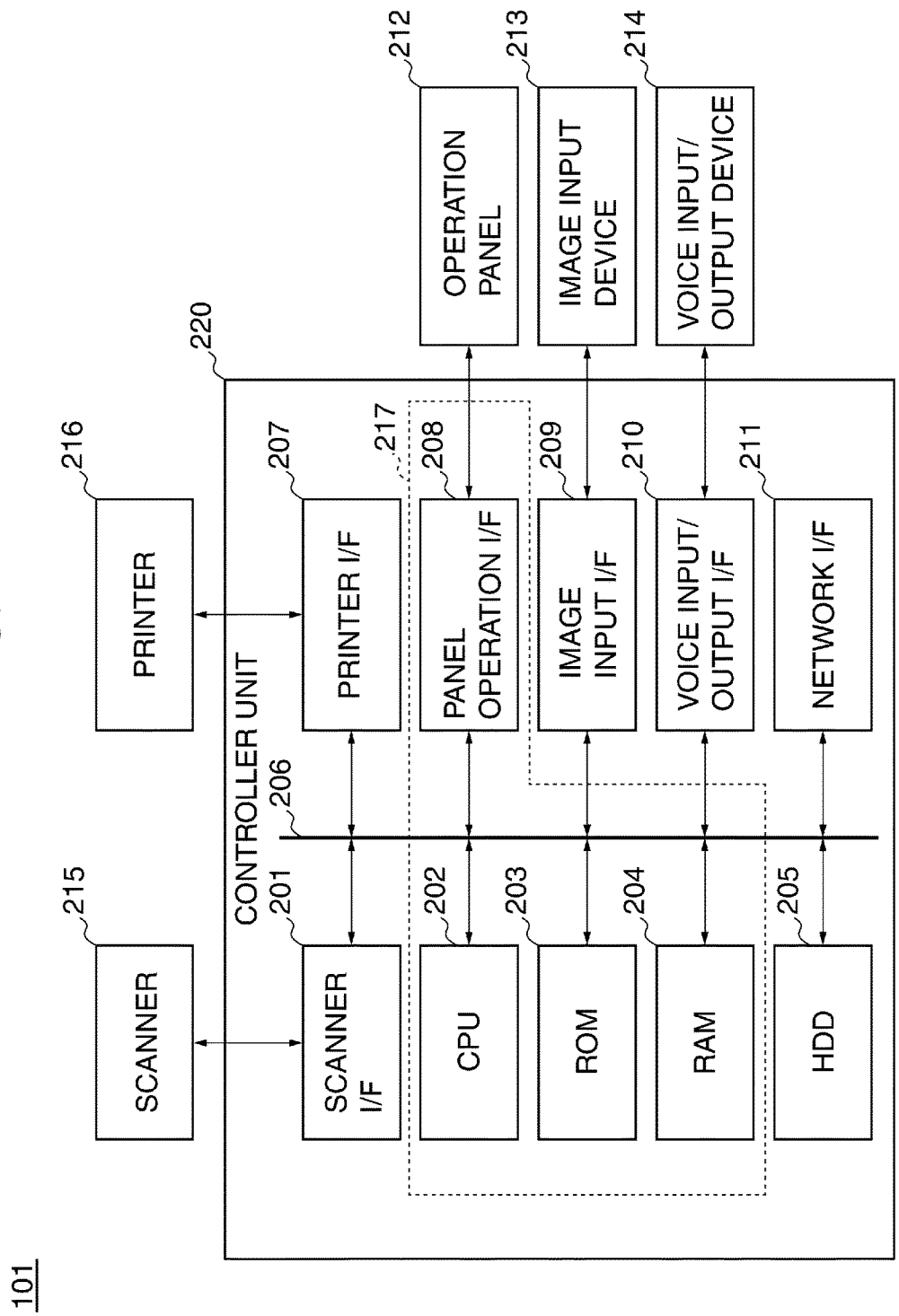

FIG. 3A

CALL CENTER CONNECTION INFORMATION

| SESSION MANAGEMENT SERVER URL | http://aaa |
|---|---|
| FIRST-TIME CONNECTION DESTINATION TERMINAL ID | Tokyo-Helpdesk |

FIG. 3B

REDIAL SETTING INFORMATION

| REDIAL BUTTON ID | 1001 |
|---|---|
| REDIAL DESTINATION TERMINAL ID | Tokyo-CE111 |
| NAME OF PERSON IN CHARGE AT REDIAL DESTINATION | TARO SUZUKI XX CO.LTD. |
| IMAGE OF PERSON IN CHARGE AT REDIAL DESTINATION | 0055.jpg |
| CONNECTED USER NAME | Tanaka123 |
| DISCONTINUED TIME | 12: 10, DECEMBER 10, 2012 |
| REDIAL BUTTON DISPLAY PERIOD EXPIRATION TIME | 23: 59, DECEMBER 17, 2012 |
| DISCONTINUED SCREEN | COPY STAPLE SETTING SCREEN (SCREEN ID: 321)) |

US 9,979,842 B2

IMAGE FORMING APPARATUS THAT TRANSMITS AND RECEIVES MAINTENANCE WORK DATA TO AND FROM INFORMATION PROCESSING APPARATUS, METHOD OF CONTROLLING THE SAME, AND STORAGE MEDIUM

BACKGROUND OF THE INVENTION

Field of the Invention

The present invention relates to an image forming apparatus that transmits and receives maintenance work data to and from an information processing apparatus, a method of controlling the same, and a storage medium.

Description of the Related Art

For current image forming apparatuses, there has been proposed a remote maintenance service using voice and moving image communication, and remote control (see e.g. Japanese Patent Laid-Open Publication No. 2005-208974). In the remote maintenance service, when an image forming apparatus suffers from an error, it is possible to solve the problem by directly telling a user how to eliminate the error from a call center without sending a service person to the user's site for repair. This makes it possible to reduce time required to eliminate the error.

In this remote maintenance service, it is effective for a user to achieve connection with the call center by using a communication unit of the image forming apparatus without using an apparatus other than the image forming apparatus, such as a telephone and a PC.

In view of this, there has been proposed a technique for providing an image forming apparatus with a communication unit that is compatible with SIP (Session Initiation Protocol), and transmitting and receiving moving image data and voice data to and from another information terminal connected to the Internet by a session established using SIP (see e.g. Japanese Patent Laid-Open Publication No. 2007-221709).

To establish a SIP session through a firewall introduced to an office, there is a high possibility that infrastructure improvement, such as provision of SIP proxy, is required. Some offices may have difficulty in introducing SIP because of the capital investment required for this.

To solve this problem, there has been proposed a technique for establishing a session between information terminals using HTTP having high compatibility with a firewall (see e.g. Allround Internet Telephony Protocol: HTTP-based Conference Application Protocol (Special Issue on High Speed Networks and Multimedia Applications) IPSJ (Information Processing Society of Japan) Journal 44(3), 553-560, 2003-03-15).

Access from the Internet side to an information terminal protected by a firewall is limited. On the other hand, access from the information terminal side inside the firewall to the Internet is allowed when HTTP having high compatibility with the firewall is used.

Therefore, in the above-mentioned IPSJ Journal 44(3), 553-560, two information terminals separated from each other by the firewall achieve session establishment therebetween by accessing a session management server, to which each information terminal can connect as an HTTP client, from the information terminal side, respectively.

In the remote maintenance service, depending on the details of maintenance and the details of a trouble, it is sometimes required to temporarily disconnect the image forming apparatus from the call center, and perform the maintenance work at a time designated by the user.

Such maintenance work is performed e.g. in a case where it takes time to perform a detailed survey on the trouble at the call center, or in a case where even during receiving the remote maintenance service, the user desires to use a function of the image forming apparatus which is not affected by the problem of the trouble, before the trouble is fixed.

In the above-mentioned IPSJ Journal 44(3), 553-560, to establish a session again after a session between the two information terminals and the session management server is temporarily disconnected, it is necessary to reconnect from the information terminal side to the session management server.

Therefore, to execute the remote maintenance work at the time designated by the user, the user of the image forming apparatus must take the trouble of performing the operation for connecting from the image forming apparatus to the session management server again at the designated time.

SUMMARY OF THE INVENTION

The present invention provides an image forming apparatus that is capable of reducing the trouble of operation of the user, when being disconnected from and reconnected to an information processing apparatus for transmission and reception of maintenance work data for maintenance work, a method of controlling the same, and a storage medium.

In a first aspect of the present invention, there is provided an image forming apparatus that connects to an information processing apparatus to transmit and receive maintenance work data for performing maintenance work on the image forming apparatus, including voice data or moving image data, to and from the information processing apparatus, and displays a maintenance work screen for the maintenance work on a display section, comprising a storage unit configured to store, in a case where during connection with the information processing apparatus, the image forming apparatus is required to be disconnected and then reconnected, identification information for identifying an information processing apparatus to be reconnected, in a storage section, an icon display unit configured to display an icon for enabling a user to give an instruction for reconnection to the information processing apparatus identified by the identification information, on the display section, in a case where the identification information is stored in the storage section, and a reconnection unit configured to reconnect to the information processing apparatus identified by the identification information stored by the storage unit, in a case where the user has instructed the reconnection by using the icon displayed on the icon display unit.

In a second aspect of the present invention, there is provided a method of controlling an image forming apparatus that connects to an information processing apparatus to transmit and receive maintenance work data for performing maintenance work on the image forming apparatus, including voice data or moving image data, to and from the information processing apparatus, and displays a maintenance work screen for the maintenance work on a display section, comprising storing, in a case where during connection with the information processing apparatus, the image forming apparatus is required to be disconnected and then reconnected, identification information for identifying an information processing apparatus to be reconnected, in a storage section, displaying an icon for enabling a user to give an instruction for reconnection to the information processing apparatus identified by the identification information, on the display section, in a case where the reconnection information is stored in the storage section, and reconnecting to the information processing apparatus identified by the identification information stored by said storing, in a case where the user has instructed the reconnection by using the icon displayed by said displaying.

In a third aspect of the present invention, there is provided a non-transitory computer-readable storage medium storing a computer-executable program for executing a method of controlling an image forming apparatus that connects to an information processing apparatus to transmit and receive maintenance work data for performing maintenance work on the image forming apparatus, including voice data or moving image data, to and from the information processing apparatus, and displays a maintenance work screen for the maintenance work on a display section, wherein the method comprises storing, in a case where during connection with the information processing apparatus, the image forming apparatus is required to be disconnected and then reconnected, identification information for identifying an information processing apparatus to be reconnected, in a storage section, displaying an icon for enabling a user to give an instruction for reconnection to the information processing apparatus identified by the identification information, on the display section, in a case where the reconnection information is stored in the storage section, and reconnecting to the information processing apparatus identified by the identification information stored by said storing, in a case where the user has instructed the reconnection by using the icon displayed by said displaying.

According to the present invention, in a case where disconnection from and reconnection to the information processing apparatus is to be performed, identification information for identifying an information processing apparatus to which the image forming apparatus is to be reconnected is stored in a storage section. An icon for enabling the user to give an instruction for reconnecting to the information processing apparatus identified by the identification information is displayed on a display section. When the reconnection is instructed by the user using the icon, the image forming apparatus reconnects to the information processing apparatus identified by the stored identification information. Therefore, it is possible to reduce the trouble of operation of the user, when the image forming apparatus is disconnected from and reconnected to the information processing apparatus for transmission and reception of maintenance work data for maintenance work.

Further features of the present invention will become apparent from the following description of exemplary embodiments (with reference to the attached drawings).

BRIEF DESCRIPTION OF THE DRAWINGS

FIG. 1 is a schematic diagram of a remote maintenance system including an image forming apparatus according to an embodiment of the present invention.

FIG. 2 is a block diagram of the hardware configuration of the image forming apparatus appearing in FIG. 1.

FIG. 3A is a diagram showing call center connection information.

FIG. 3B is a diagram showing redial setting information.

DESCRIPTION OF THE EMBODIMENTS

Figure 4:
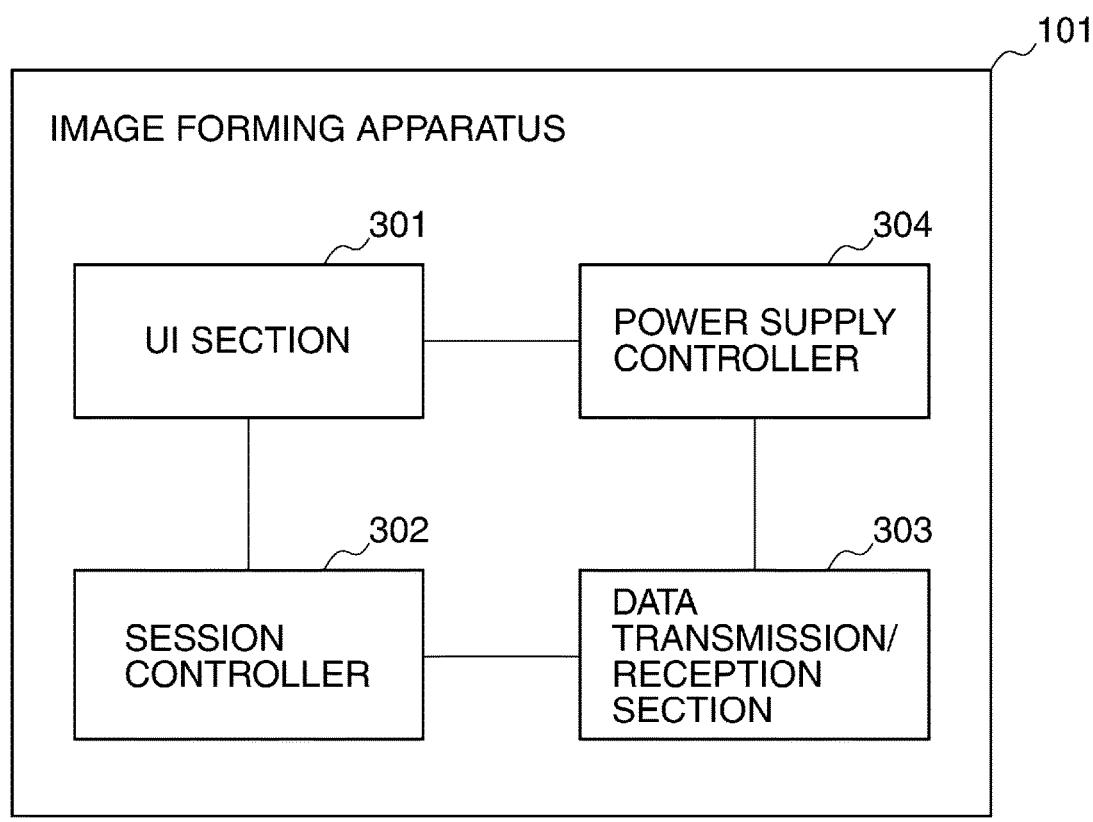
FIG. 4 is a block diagram of the software configuration of the image forming apparatus appearing in FIG. 1.

The present invention will now be described in detail below with reference to the accompanying drawings showing embodiments thereof.

FIG. 1 is a schematic diagram of a remote maintenance system 100 including an image forming apparatus 101 according to an embodiment of the present invention.

Referring to FIG. 1, the remote maintenance system 100 is comprised of the image forming apparatus 101, a firewall 105, the Internet 106, a session management server 104, and call center terminals 102 and 103.

Out of these, the image forming apparatus 101, and the call center terminals 102 and 103 are each equipped with a communication function as an HTTP client. Further, the image forming apparatus 101, and the call center terminals 102 and 103 each have a remote maintenance function using e.g. voice and moving image communication, and remote control, and operate as communication partners in the remote maintenance.

The image forming apparatus 101 accesses the session management server 104 connected to the Internet 106 via the firewall 105, by using HTTP.

Further, the image forming apparatus 101 designates a terminal ID of a call center terminal for the session management server 104, to thereby call the designated call center terminal and establish a session therewith. Then, the image forming apparatus 101 transmits and receives data to and from the called call center terminal via the session management server 104.

The session management server 104 is equipped with a communication function as an HTTP server. The session management server 104 manages sessions between the image forming apparatus 101 and the call center terminals 102 and 103.

The call center terminals 102 and 103 connect to the session management server 104 by using HTTP. In the present embodiment, the call center terminal 102 is a terminal which is operated by a receiving operator of the call center, as a reception terminal for receiving access from the image forming apparatus 101. Further, the call center terminal 102 dispatches a session established first with the image forming apparatus 101 to the call center terminal 103 as a maintenance terminal for performing maintenance work.

On the other hand, the call center terminal 103 is a terminal operated by a maintenance operator at the call center as the maintenance terminal for performing maintenance work on the image forming apparatus 101. The call center terminal 103 performs remote maintenance of the image forming apparatus 101, by voice and moving image communication and remote control, in the session with the image forming apparatus 101 dispatched from the call center terminal 102.

Although in the present embodiment, the HTTP protocol is used for connection between the image forming apparatus 101 and the session management server 104, any other communication protocol having high compatibility with a firewall may be used.

Similarly, although in the present embodiment, the HTTP protocol is used for connection between the call center terminals 102 and 103 and the session management server 104, any other communication protocol may be used.

Further, although in the present embodiment, data transmission and reception between the image forming apparatus 101 and the call center terminals 102 and 103 is performed via the session management server 104, a communication path directly connecting from the image forming apparatus to the call center terminals may be established separately. As described above, the image forming apparatus 101 according to the present embodiment accesses the information processing apparatuses (call center terminals 102 and 103) to transmit and receive maintenance work data including voice data and moving image data for performing the maintenance work on the image forming apparatus 101 to and from the information processing apparatuses. In the present embodiment, the above-mentioned voice data and moving image data, and data for remote control are used as the maintenance work data.

FIG. 2 is a block diagram of the hardware configuration of the image forming apparatus 101 appearing in FIG. 1.

Referring to FIG. 2, the image forming apparatus 101 is comprised of a controller unit 220, a scanner 215, a printer 216, an operation panel 212, an image input device 213, and a voice input/output device 214.

Further, the controller unit 220 is comprised of a scanner interface 201, a CPU 202, a ROM 203, a RAM 204, an HDD 205, a printer interface 207, a panel operation interface 208, an image input interface 209, a voice input/output interface 210, and a network interface 211, which are connected to each other via a system bus 206.

Figure 5:
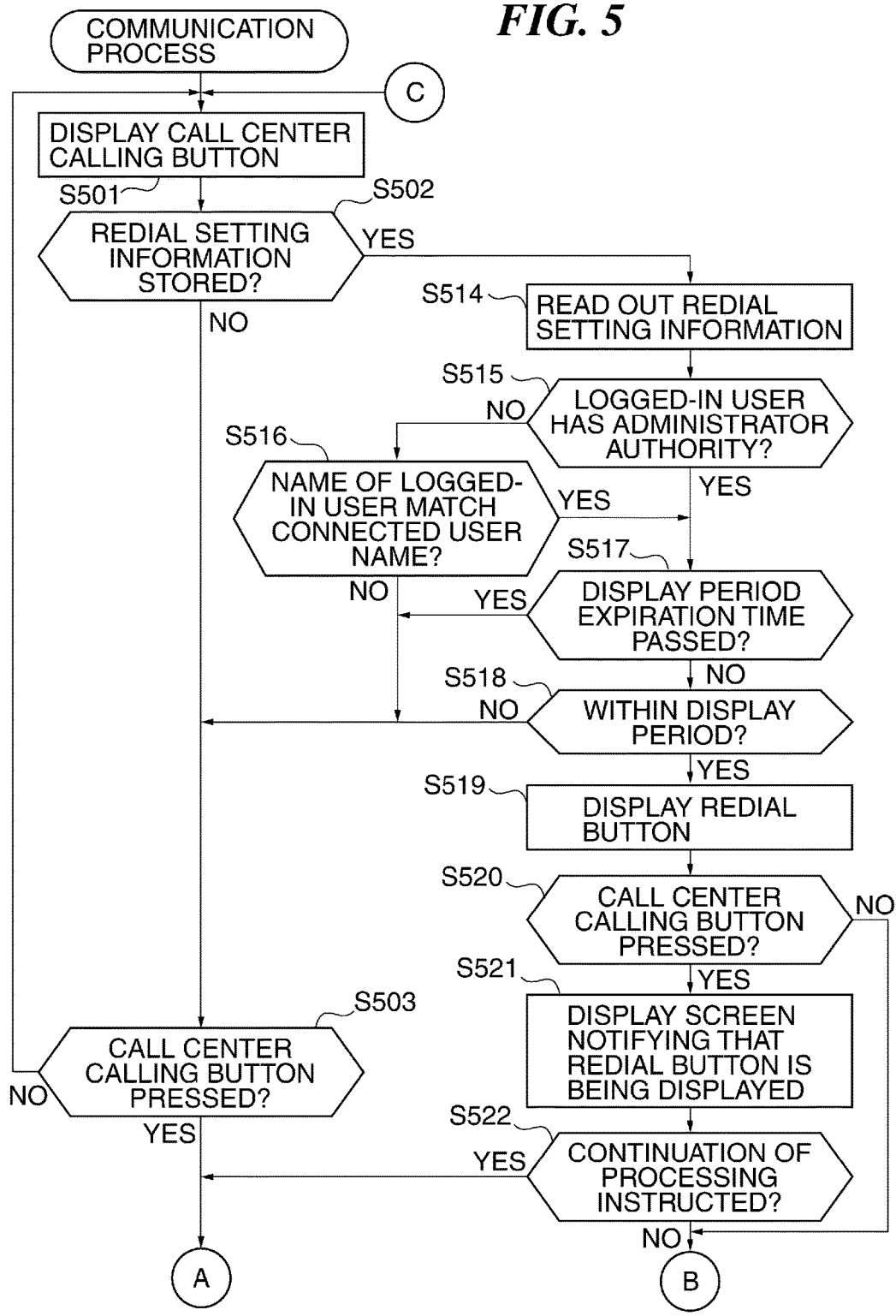
FIG. 5 is a flowchart of a communication process for communicating with call center terminals, which is executed by a CPU appearing in FIG. 2.
Figure 6:
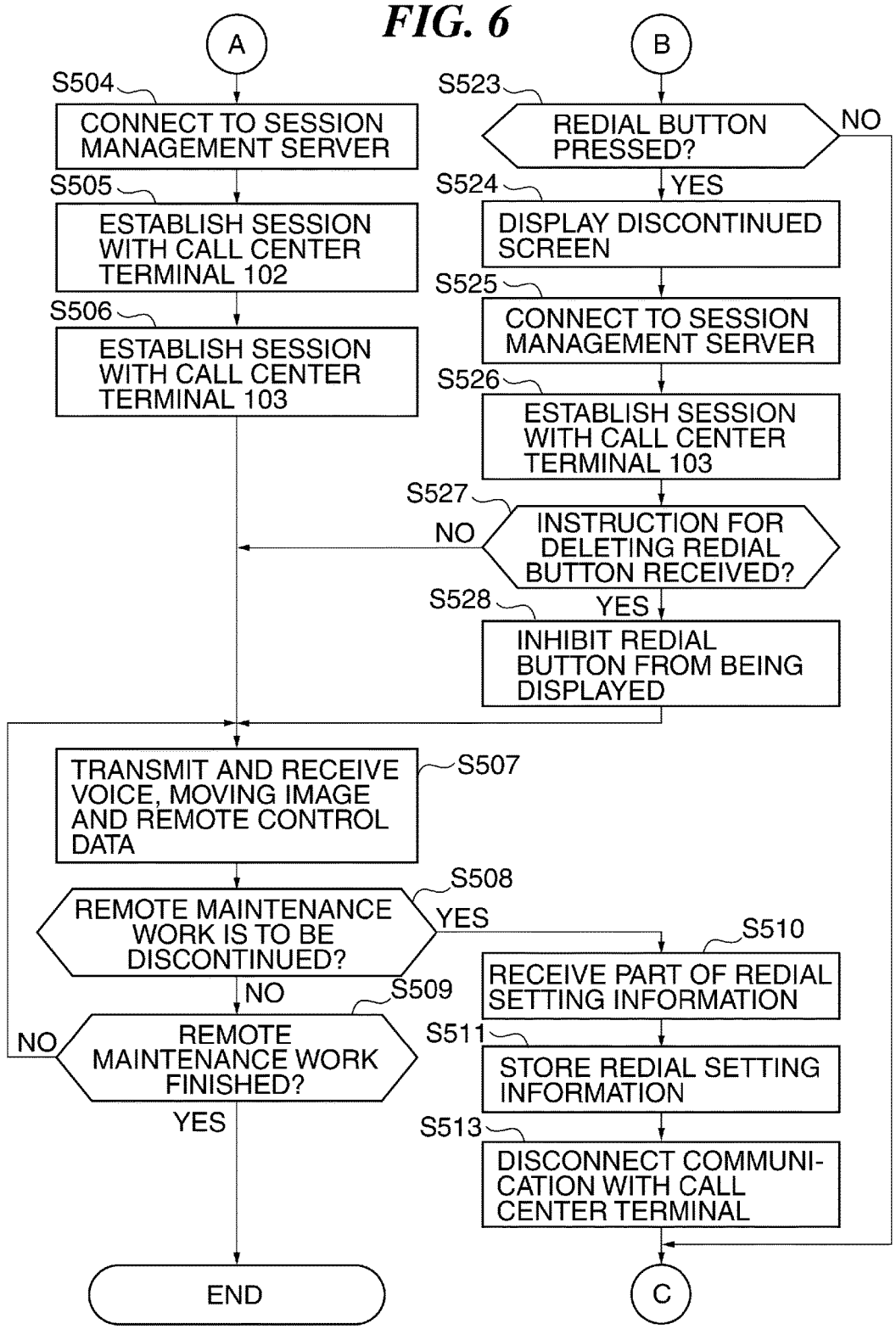
FIG. 6 is a continuation of FIG. 5.

The CPU 202 performs centralized control of access to various devices connected to the system bus 206 based on a control program stored in the ROM 203 or the HDD 205 to thereby control the overall operation of the image forming apparatus 101. A communication process, described hereinafter with reference to FIGS. 5 and 6, is a process executed by loading a program stored in the HDD 205 into the RAM 204 by the CPU 202.

The RAM 204 mainly functions as a main memory and a work area for the CPU 202, and can expand its memory capacity by connecting an optional RAM to an expansion port, not shown.

The HDD 205 stores a boot program, various application programs, font data, user files, editing files, and so forth. Note that not only the HDD 205, but also an SD card, a flash memory, or the like may be used as an external storage device.

The scanner interface 201 controls input of an image from the scanner 215. The printer interface 207 controls output of an image to the printer 216. The panel operation interface 208 receives an operation from a user, and controls display on the operation panel 212 as a display section configured to display a maintenance work screen for displaying a moving image from the call center terminal 102 or 103, and input of various setting information set on the operation panel 212 as an operating section.

The image input interface 209 controls input of an image from the image input device 213, such as a camera. The voice input/output interface 210 controls input and output of a voice from and to the voice input/output device 214, such as a head set. The network interface 211 performs data communication with an external network via a network cable.

The image forming apparatus 101 described above is capable of operating in two operating modes: a normal mode in which electric power is supplied to all of units of the image forming apparatus 101, shown in FIG. 2, and a power-saving mode in which electric power is supplied only to a block 217 of several units.

FIG. 3A is a diagram showing call center connection information, and FIG. 3B is a diagram showing redial setting information. These are stored in the HDD 205.

Referring to FIG. 3A, the call center connection information is formed by a session management server URL and a first-time connection destination terminal ID. The session management server URL indicates a URL of the session management server 104. The first-time connection destination terminal ID indicates a terminal ID of one of call center terminals which is to be accessed first, and in the present embodiment, it indicates the terminal ID of the call center terminal 102.

Referring to FIG. 3B, the redial setting information is formed by a redial button ID, a redial destination terminal ID, the name of a person in charge at a redial destination, an image of the person in charge at the redial destination, a connected user name, a discontinued time, a redial button display period expiration time, and a discontinued screen.

The redial button ID displays identification information for identifying this redial setting information. The redial destination terminal ID indicates a terminal ID of a call center terminal the telephone number of which is to be redialed when the redial button is pressed.

The name of a person in charge at a redial destination indicates the name of the operator as a person in charge at the call center terminal to which the image forming apparatus has been connected, and the image of the person in charge at the redial destination indicates face photograph data of the operator.

The connected user name indicates an account name of the user having been receiving the remote maintenance service. The discontinued time indicates a time at which the connection was discontinued. The redial button display period expiration time indicates a time limit up to which the redial button is displayed on the image forming apparatus 101, for resuming the interrupted remote maintenance work. The discontinued screen indicates a final screen displayed before the user discontinued receiving the remote maintenance service. In the case of the illustrated example, the discontinued screen is indicated by a screen ID of a copy staple setting screen.

FIG. 4 is a block diagram of the software configuration of the image forming apparatus 101 appearing in FIG. 1.

Referring to FIG. 4, the image forming apparatus 101 is comprised of a user interface (UI) section 301, a session controller 302, a data transmission/reception section 303, and a power supply controller 304. These sections are realized by loading programs stored in the HDD 205 into the RAM 204 and executing the loaded programs by the CPU 202.

The user interface section 301 controls display on the operation panel 212 and input of various setting information set on the operation panel 212, via the panel operation interface 208.

The session controller 302 accesses the session management server 104 via the network interface 211 according to the settings of the call center connection information shown in FIG. 3A, which is stored in the HDD 205.

The data transmission/reception section 303 transmits and receives data, such as voice data, moving image data, remote control data, and information included in the redial setting information, in a session established by the session controller 302 via the network interface 211.

Further, the data transmission/reception section 303 controls the voice input/output interface 210, the image input interface 209, the panel operation interface 208, and so forth, as required. The power supply controller 304 performs control concerning the power supply, such as control performed when shutdown is instructed e.g. by a user through switching-off of the power switch, and control of where to supply power.

FIG. 5 is a flowchart of a communication process for communicating with the call center terminals 102 and 103, which is executed by the CPU 202 appearing in FIG. 2, and FIG. 6 is a continuation of FIG. 5.

Referring to FIG. 5, the user interface section 301 displays a call center calling button, not shown (step S501). Next, the user interface section 301 determines whether or not the redial setting information is stored in the HDD 205 (step S502).

If it is determined in the step S502 that the redial setting information is not stored (NO to the step S502), the user interface section 301 determines whether the call center calling button has been pressed (step S503).

If it is determined in the step S503 that the call center calling button has not been pressed (NO to the step S503), the CPU 202 returns to the step S501.

If it is determined in the step S503 that the call center calling button has been pressed (YES to the step S503), the CPU 202 proceeds to a step S504 in FIG. 6, wherein the session controller 302 reads the session management server URL of the call center connection information shown in FIG. 3A from the HDD 205, and accesses the session management server 104 by using HTTP (step S504).

Then, the session controller 302 reads the first-time connection destination terminal ID of the call center connection information from the HDD 205, and sends the read ID to the session management server 104 to thereby establish a session with the call center terminal 102 (step S505), and further establish a session with the call center terminal 103 (step S506).

As a consequence, the destination to and from which data is transmitted and received by the data transmission/reception section 303 is changed to the call center terminal 103, whereby the user of the image forming apparatus 101 performs transmission and reception of voice data, moving image data, and remote control data, and so forth for the maintenance work to and from the call center terminal 103 (step S507). At this time, depending on the details and status of the trouble, remote control of the image forming apparatus 101 is performed by the maintenance operator from the call center terminal 103.

Next, the session controller 302 determines whether or not to discontinue the remote maintenance service (step S508). The discontinuation at this time includes discontinuation caused by receiving a discontinuation instruction from the user via the user interface section 301, and discontinuation caused by receiving a discontinuation instruction from the call center terminal 103 via the data transmission/reception section 303.

If it is determined in the step S508 that the remote maintenance service is not to be discontinued (NO to the step S508), the CPU 202 determines whether or not the remote maintenance work has been finished by eliminating the trouble through the remote maintenance work (step S509).

If it is determined in the step S509 that the remote maintenance work has not been finished (NO to the step S509), the CPU 202 returns to the step S507, whereas if the remote maintenance work has been finished (YES to the step S509), the CPU 202 terminates the present process.

Referring back to the step S508, if it is determined that the remote maintenance service is to be discontinued (YES to the step S508), the data transmission/reception section 303 receives part of the redial setting information shown in FIG. 3B (step S510). The part of the redial setting information is formed by the redial destination terminal ID, the name of the person in charge at the redial destination, the image of the person in charge at the redial destination, the discontinued time, and the redial button display period expiration time.

The data transmission/reception section 303 stores the above-mentioned items of information, in the HDD 205, and further, the user interface section 301 stores the remainder of the redial setting information, i.e. the redial button ID, the connected user name, and the discontinued screen, in the HDD 205 (S511). That is, in this step S511, the redial setting information is stored in the HDD 205. The step S511 corresponds to the operation of a storage unit configured to store, in a case where during connection with the information processing apparatus, the image forming apparatus is required to be disconnected and then reconnected, identification information (redial destination terminal ID) for identifying an information processing apparatus to be reconnected, in a storage section (HDD 205).

Then, the session controller 302 disconnects the session with the call center terminal 103 (step S513), and the CPU 202 returns to the step S501 in FIG. 5.

Referring back to the step S502 in FIG. 5, if it is determined that the redial setting information is stored (YES to the step S502), the user interface section 301 reads out the redial information stored in the HDD 205 (step S514).

Then, the user interface section 301 acquires the user information of the logged-in user of the image forming apparatus 101, and determines whether or not the logged-in user has the administrator authority (step S515).

If it is determined in the step S515 that the logged-in user does not have the administrator authority (NO to the step S515), the user interface section 301 determines whether or not the name of the logged-in user matches the connected user name of the redial setting information (step S516).

If it is determined in the step S516 that the name of the logged-in user does not match the connected user name of the redial setting information (NO to the step S516), the CPU 202 proceeds to the step S503. The processing in this step is for excluding users other than a user having the administrator authority and the user having the connected user name of the redial setting information. Thus, the present embodiment is configured to store the reconnection information (redial setting information) in the storage section, and display an icon only when the user having logged in the image forming apparatus 101 is one of predetermined users. Here, the predetermined users are users having the administrator authority and the user having the connected user name of the redial setting information, by way of example, but they may be other users.

If either of the answers to the questions of the steps S515 and S516 is affirmative (YES), the user interface section 301 determines whether or not the current date and time has passed the redial button display period expiration time of the redial setting information (step S517).

If it is determined in the step S517 that the current date and time has passed the redial button display period expiration time (YES to the step S517), the CPU 202 proceeds to the step S503.

On the other hand, if it is determined in the step S517 that the current date and time has not passed the redial button display period expiration time (NO to the step S517), the user interface section 301 determines whether or not the current date and time is included in a display time period which starts from the discontinued time of the redial setting information, and is separately and independently set in the image forming apparatus 101 (step S518).

If it is determined in the step S518 that the current date and time is not included in the display time period (NO to the step S518), the CPU 202 proceeds to the step S503.

If it is determined in the step S518 that the current date and time is included in the display time period (YES to the step S518), the user interface section 301 displays the redial button (step S519). In doing this, the user interface section 301 reads out the name of the person in charge at the redial destination and image of the person in charge at the redial destination of the redial setting information, and displays them together with the redial button. The step S519 corresponds to the operation of an icon display unit configured to display an icon for enabling a user to give an instruction for reconnection to the information processing apparatus identified by the identification information (redial destination terminal ID) on the display section, in a case where the reconnection information (redial setting information) is stored in the storage section. In the present embodiment, a button is displayed as an example of the icon, but any other suitable icon other than the button may be displayed. Further, together with the icon, information on the information processing apparatus to which the image forming apparatus was connected before disconnection is displayed on the display section. Here, as the information on the information processing apparatus, there are displayed the name of the person in charge at the redial destination and image of the person in charge at the redial destination of the redial setting information, by way of example, but this is not limitative.

Next, the user interface section 301 determines whether or not the call center calling button has been pressed (step S520).

If it is determined in the step S520 that the call center calling button has not been pressed (NO to the step S520), the CPU 202 proceeds to a step S523, referred to hereinafter, in FIG. 6.

On the other hand, if it is determined in the step S520 that the call center calling button has been pressed (YES to the step S520), the user interface section 301 displays a screen showing a message "Although the redial button is displayed, it is not pressed but the call center calling button is pressed instead." (step S521), to prompt the user to confirm that this operation is intended by the user. Thus, in the present embodiment, an icon (redial button) is displayed on the display section, and further another icon (call center calling button) is displayed for enabling the user to give an instruction for performing maintenance work on the image forming apparatus 101 by connecting to the information processing apparatus. In this state, when the call center calling button is operated for giving the instruction for performing the maintenance work on the image forming apparatus 101, a screen indicating that the call center calling button has been operated for giving the instruction is displayed on the display section.

This is for confirming that in spite of existence of the trouble which has not been eliminated yet, the user does not intend to resume the remote maintenance work, but to receive the remote maintenance service anew.

Under the circumstance, the user interface section 301 determines whether or not an instruction has been given for continuing processing to be executed in accordance with pressing of the call center calling button so as to receive the remote maintenance service anew (step S522).

If it is determined in the step S522 that the instruction for continuing the processing has been given (YES to the step S522), the CPU 202 proceeds to the step S504 in FIG. 6.

On the other hand, if it is determined in the step S522 that the instruction for continuing the processing has not been given (NO to the step S522), the CPU 202 proceeds to the step S523 in FIG. 6, wherein the user interface section 301 determines whether or not the redial button has been pressed by the user.

If it is determined in the step S523 that the redial button has not been pressed by the user (NO to the step S523), the CPU 202 returns to the step 501 in FIG. 5.

On the other hand, if it is determined in the step S523 that the redial button has been pressed by the user (YES to the step S523), the user interface section 301 reads out the discontinued screen of the redial setting information, and displays the discontinued screen (step S524). This makes it possible to smoothly resume the remote maintenance work from the discontinued point after the redial. The step S524 corresponds to the operation of a screen display unit configured to display the maintenance work screen indicated by the screen information (discontinued screen) on the display section.

Then, the session controller 302 reads out the session management server URL of the call center connection information shown in FIG. 3A from the HDD 205, and accesses the session management server 104 by using HTTP (step S525).

Then, the session controller 302 reads out the redial destination terminal ID of the call center connection information, and sends the same to the session management server 104, to thereby establish a session with the call center terminal 103 (step S526). This makes it possible to directly connect to the call center terminal 103 which actually provides the remote maintenance service, by skipping the session establishment with the call center terminal 102 which is to be executed in the step S505 when connecting the call center anew. The step S526 corresponds to the operation of a reconnection unit configured to reconnect to the information processing apparatus identified by the identification information (redial destination terminal ID), in a case where the user has instructed the reconnection by using the displayed icon.

Next, the data transmission/reception section 303 determines whether or not an instruction for deleting the redial button has been received from the call center terminal 103 (step S527). Thus, in the present embodiment, in a case where the instruction for deleting the redial button has been received from the information processing apparatus (YES to the step S527), or in a case where a predetermined display period expiration time has passed (YES to the step S517 or NO to the step S518, the icon is inhibited from being displayed.

If it is determined in the step S527 that the an instruction for deleting the redial button has not been received from the call center terminal 103 (NO to the step S527), the CPU 202 proceeds to the step S507.

On the other hand, if it is determined in the step S527 that the an instruction for deleting the redial button has been received from the call center terminal 103 (YES to the step S527), the user interface section 301 inhibits the redial button from being displayed, and deletes the redial setting information stored in the HDD 205 (step S528), followed by the CPU 202 proceeding to the step S507.

Thus, it is possible to improve the convenience of the user and the operator concerning redialing and operation resumption when the remote maintenance work is discontinued.

Further, even in a case where a user discontinues receiving the remote maintenance service from the call center and thereafter receives the same again at a different time, it is possible to restart a session between the image forming apparatus and the call center, without bothering the user.

According to the embodiment described heretofore, in a case where the image forming apparatus is once disconnected from the information processing apparatus and is then connected thereto again, it stores reconnection information including screen information indicating a maintenance work screen being displayed on the display section before discontinuing the display on the display section due to the disconnection, in a storage section (step S511), and when the reconnection is instructed by the user, the maintenance work screen indicated by the stored screen information is displayed on the display section (step S524). Therefore, the user is capable of easily understanding the details of the maintenance work when the image forming apparatus is reconnected to the information processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-168570 filed Aug. 14, 2013, which is hereby incorporated by reference herein in its entirety.

What is claimed is:

1. An image forming apparatus configured to connect to a session management server that is configured to manage a communication between the image forming apparatus and a call center terminal, to transmit and receive maintenance work data for performing a maintenance work on the image forming apparatus, the image forming apparatus comprising:
  a processor configured to implement instructions stored in a memory and execute:
    a storage task that stores in a storage section, before a connection between the image forming apparatus and a call center terminal, via the session management server, is disconnected, information corresponding to a maintenance service by a call center terminal that is to communicate with the image forming apparatus via the session management server;
    a display task that displays a first graphical user interface and a second graphical user interface, on a display section of the image forming apparatus, in a case where the storage task stores the information in the storage section, wherein the first graphical user interface is usable by a user to give an instruction to communicate with the call center terminal providing the maintenance service corresponding to the information stored by the storage task and to continue a maintenance service that was started before the connection between the image forming apparatus and a call center terminal is disconnected, and the second graphical user interface is usable by the user to give an instruction to communicate with a call center terminal to receive a remote maintenance service anew; and
    a connection task that connects to the session management server to communicate with the call center terminal providing the maintenance service identified by the information stored by the storing task, in a case where an instruction to connect is received from the first graphical user interface.

2. The image forming apparatus according to claim 1, wherein:
  the information includes screen information indicating a maintenance work screen being displayed on the display section when the display on the display section is discontinued by disconnection from the information processing apparatus,
  the processor is further configured to execute a first screen display task that displays the maintenance work screen indicated by the screen information stored by the storage task, on the display section.

3. The image forming apparatus according to claim 1, wherein the display task does not display the first graphical user interface in a case where an instruction for deleting the first graphical user interface is received from the information processing apparatus, or in a case where a predetermined display period expiration time has passed.

4. The image forming apparatus according to claim 1, wherein the display task displays the first graphical user interface, in a case where the information is stored in the storage section, and a user who has logged in the image forming apparatus is a predetermined user.

5. The image forming apparatus according to claim 2, wherein the processor is further configured to execute a second screen display task that displays a screen for notifying the user that the second graphical user interface has been operated for giving an instruction to communicate with a call center terminal to receive a remote maintenance service anew, in a case where an instruction for performing the maintenance work on the image forming apparatus is received from the second graphical user interface.

6. The image forming apparatus according to claim 1, wherein the display task displays not only the first graphical user interface, but also information concerning the information processing apparatus to which the image forming apparatus has been connected before disconnecting therefrom, on the display section.

7. A method of controlling an image forming apparatus configured to connect to a session management server that is configured to manage a communication between the image forming apparatus and a call center terminal, to transmit and receive maintenance work data for performing a maintenance work on the image forming apparatus, the method comprising:

a storage step of storing, in a storage section, before a connection between the image forming apparatus and a call center terminal, via the session management server, is disconnected, information corresponding to a maintenance service by a call center terminal that is to communicate with the image forming apparatus via the session management server;

a displaying step of displaying a first graphical user interface and a second graphical user interface, on a display section of the image forming apparatus, in a case where the storage step stores the information in the storage section, wherein the first graphical user interface is usable by a user to give an instruction to communicate with the call center terminal providing the maintenance service corresponding to the information stored in the storage step and to continue a maintenance service that was started before the connection between the image forming apparatus and a call center terminal is disconnected, and the second graphical user interface is usable by the user to give an instruction to communicate with a call center terminal to receive a remote maintenance service anew; and a connection step of connecting to the session management server to communicate with the call center terminal providing the maintenance service identified by the information stored in the storage step, in a case where an instruction to connect is received from the first graphical user interface.

8. The method according to claim 7, wherein:

the information includes screen information indicating a maintenance work screen being displayed on the display section when the display on the display section is discontinued by disconnection from the information processing apparatus, and the method further comprising a first screen displaying step of displaying the maintenance work screen indicated by the screen information stored in the storage step, on the display section.

9. The method according to claim 7, wherein the displaying step does not display the first graphical user interface in a case where an instruction for deleting the first graphical user interface is received from the information processing apparatus, or in a case where a predetermined display period expiration time has passed.

10. The method according to claim 7, wherein the icon displaying step displays the first graphical user interface, in a case where the information is stored in the storage section, and a user who has logged in the image forming apparatus is a predetermined user.

11. The method according to claim 8, further comprising a second screen displaying step of displaying a screen for notifying the user that the second graphical user interface has been operated for giving an instruction to communicate with a call center terminal to receive a remote maintenance service anew, in a case where an instruction for performing the maintenance work on the image forming apparatus is received from the second graphical user interface.

12. The method according to claim 7, wherein the displaying step displays not only the first graphical user interface, but also information concerning the information processing apparatus to which the image forming apparatus has been connected before disconnecting therefrom, on the display section.

13. A non-transitory computer-readable storage medium storing a computer-executable program for executing a method of controlling an image forming apparatus configured to connect to a session management server that is configured to manage a communication between the image forming apparatus and a call center terminal, to transmit and receive maintenance work data for performing a maintenance work on the image forming apparatus, wherein the method comprises the steps of:

a storage step of storing, in a storage section, before a connection between the image forming apparatus and a call center terminal, via the session management server, is disconnected, information corresponding to a maintenance service by a call center terminal that is to communicate with the image forming apparatus via the session management server;

a displaying step of displaying a first graphical user interface and a second graphical user interface, on a display section of the image forming apparatus, in a case where the storage step stores the information in the storage section, wherein the first graphical user interface is usable by a user to give an instruction to communicate with the call center terminal providing the maintenance service corresponding to the information stored in the storage step and to continue a maintenance service that was started before the connection between the image forming apparatus and a call center terminal is disconnected, and the second graphical user interface is usable by the user to give an instruction to communicate with a call center terminal to receive a remote maintenance service anew; and a connection step of connecting to the session management server to communicate with the call center terminal providing the maintenance service identified by the information stored in the storage step, in a case where an instruction to connect is received from the first graphical user interface.

* * * * *